United States Patent
Peters (10) Patent No.: US 9,927,795 B2
(45) Date of Patent: Mar. 27, 2018

(54) ASSOCIATIVE TEMPLATES FOR MACHINING OPERATIONS AND SYSTEMS AND METHODS INCLUDING THE SAME

(71) Applicant: The Boeing Company, Chicago, IL (US)

(72) Inventor: Justin L. Peters, Alton, IL (US)

(73) Assignee: The Boeing Company, Chicago, IL (US)

( * ) Notice: Subject to any disclaimer, the term of this patent is extended or adjusted under 35 U.S.C. 154(b) by 419 days.

(21) Appl. No.: 14/635,893

(22) Filed: Mar. 2, 2015

(65) Prior Publication Data

US 2016/0259317 A1 Sep. 8, 2016

(51) Int. Cl.
*G05B 19/402* (2006.01)

(52) U.S. Cl.
CPC .. *G05B 19/402* (2013.01); *G05B 2219/36342* (2013.01)

(58) Field of Classification Search
CPC .................... G05B 19/402; G05B 2219/36342
See application file for complete search history.

(56) References Cited

U.S. PATENT DOCUMENTS

| | | | | |
|---|---|---|---|---|
| 5,465,215 A * | 11/1995 | Strickland | ............ | G05B 19/409 700/180 |
| 6,112,133 A * | 8/2000 | Fishman | .......... | G05B 19/40937 700/180 |
| 2003/0086768 A1 * | 5/2003 | Hiroyasu | ................ | B23B 27/18 408/144 |
| 2006/0099038 A1 * | 5/2006 | Hughes, Jr. | .............. | B23G 1/20 408/1 R |

OTHER PUBLICATIONS http://www.vargus.com/download/files/TM%20Solid%20Inch%20%5B150412%5Dsmall.pdf, p. 15, accessed Mar. 2, 2105.

* cited by examiner

*Primary Examiner* — Thomas Lee
*Assistant Examiner* — Vincent Chang
(74) *Attorney, Agent, or Firm* — Kunzler, PC (57) ABSTRACT

Associative templates for machining operations and systems and methods including the same are disclosed herein. The methods include defining an electronic model for a feature and defining a tool path to be traveled by a cutting tool to form the feature. The methods further include recording an associative template as program code. The program code is configured to program an electronically controlled machine tool to automatically define the electronic model of the feature and to automatically define the tool path responsive to user selection of the program code on the electronically controlled machine tool. The electronically controlled machine tool further is configured to automatically form the feature within the workpiece responsive to executing the program code. The systems include electronically controlled machine tools including machine controllers that are programmed to execute the program code.

19 Claims, 4 Drawing Sheets

ASSOCIATIVE TEMPLATES FOR MACHINING OPERATIONS AND SYSTEMS AND METHODS INCLUDING THE SAME

FIELD

The present disclosure relates generally to associative templates for machining operations and more particularly to machining systems and/or methods that include and/or utilize the associative templates.

BACKGROUND

Electronically controlled machine tools and computer aided manufacturing software together may be utilized to create and/or form a manufactured component. This process often may include forming one or more features, such as holes, threaded holes, and/or slots, in a workpiece to transform the workpiece into at least a portion of the manufactured component.

Historically, programming an electronically controlled machine tool to form the feature has been a labor-intensive process in which the computer aided manufacturing software is utilized to describe each feature that is to be formed in the workpiece in detail. This process often becomes highly repetitive, especially when a plurality of similar features is to be formed in the workpiece.

In addition, newly designed cutting tool formations are continually being developed for more efficient processes for the formation of certain features. Current computer aided manufacturing software algorithms are not always capable of producing the most efficient or applicable tool path motion for a given cutting tool. The current computer aided manufacturing software algorithms also may cause significant and/or uneven wear of a cutting tool that is utilized to form the feature and/or may require that one or more manual machining operations be performed to ensure the integrity of the feature. As an example, machining a threaded hole with an electronically controlled machine tool may include drilling a hole into the workpiece and subsequently threading the hole to define the threaded hole. The machining process may utilize a combination cutting tool consisting of a drill, a thread mill, and a chamfer in one application. This combination tool is required to extend from an entrance of the hole into the hole to define the minor diameter of the threads within the hole and to chamfer the top of the hole at a specific surface feed rate. The combination tool then forms the threads of the threaded hole at a different surface feed rate. In such a machining operation, an endmost drilling portion of the tool removes a majority of the material, with a remainder of the combination tool, which includes a threading portion and a chamfering portion, removing less of the material. Thus, endmost thread milling cutters of the combination tool generally wear at an accelerated rate relative to a remainder of the combination tool. This may require that the combination tool be sharpened and/or replaced frequently and/or may require that the threaded hole be manually chased with a tap subsequent to formation of the threaded hole by the electronically controlled machine tool. Current tool path algorithms within computer aided manufacturing software do not have the capability to utilize such a combination tool in an optimal fashion and limit user control. Thus, there exists a need for associative templates, which may be defined by user inputs, for machining operations and/or for systems and/or methods that include and/or utilize the associative templates and thus may not limit the user to existing computer aided software algorithms and/or may decrease and/or eliminate repetitive tool motions when forming the feature.

SUMMARY

Associative templates for machining operations and systems and methods including the same are disclosed herein. The methods include defining an electronic model for a feature and defining a tool path to be traveled by a cutting tool to form the feature. The methods further include recording and/or formulating an associative template as program code. The program code is configured to program an electronically controlled machine tool to automatically define the electronic model of the feature and to automatically define the tool path responsive to user selection of the program code on the electronically controlled machine tool. The electronically controlled machine tool further is configured to automatically form the feature within a workpiece responsive to executing the program code.

The systems include electronically controlled machine tools that include a workpiece holder and a cutting tool. The machine tools also include a cutting tool drive assembly, which is configured to rotate the cutting tool, and a translation assembly, which is configured to operatively translate the workpiece holder and the cutting tool relative to one another. The machine tools further include a machine controller. The machine controller is programmed to control the operation of the cutting tool drive assembly and the translation assembly. The machine controller further is programmed to execute a program code of an associative template. The program code is configured to program the electronically controlled machine tool to perform a machining operation and to automatically define an electronic model of a feature and a tool path for a cutting tool that is utilized to form the feature responsive to user selection of the program code. The machine tool further is configured to automatically form the feature within the workpiece responsive to executing the program code.

DESCRIPTION

FIGS. 1-7 provide examples of electronically controlled machine tools 20, of machining operations 100, and/or of methods 200/300, according to the present disclosure. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 1:
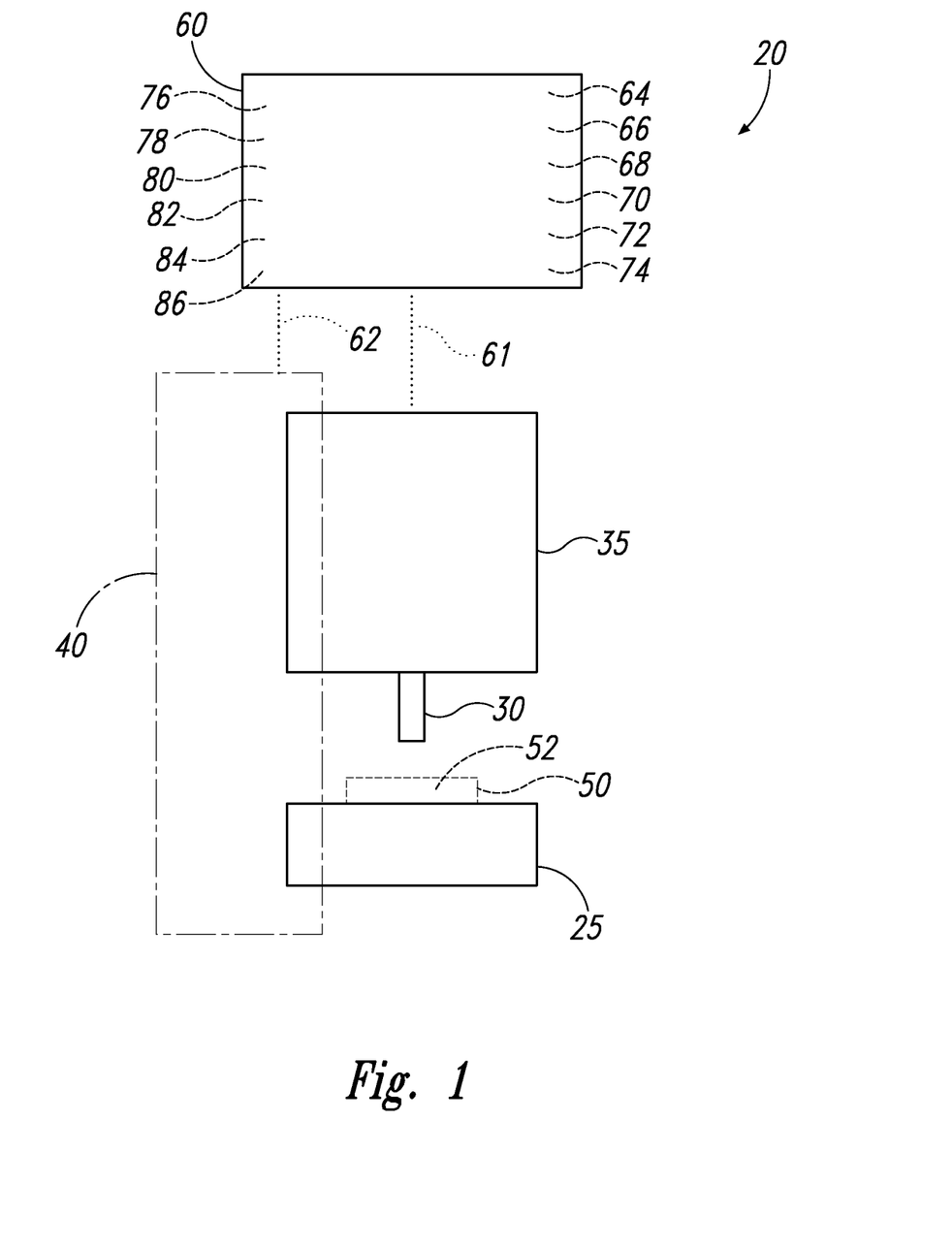
FIG. 1 is a schematic representation of examples of an electronically controlled machine tool that may include and/or utilize the systems and methods according to the present disclosure.

FIG. 1 is a schematic representation of examples of an electronically controlled machine tool 20 that may include and/or utilize the systems and methods according to the present disclosure. Electronically controlled machine tool 20 also may be referred to herein as a machine tool 20, a tool 20, a computer numerical controlled machine 20, a numerically controlled machine 20, and/or a CNC machine 20. Machine tool 20 includes a workpiece holder 25, such as a vise and/or a fixture, that is configured to support a workpiece 50. Machine tool 20 also includes a cutting tool 30, and machine tool 20 is configured to form one or more features 52 in workpiece 50 utilizing cutting tool 30. Examples of cutting tool 30 include an end mill, a combination tool, a thread mill, and/or a drill bit. Examples of features 52 include a hole, a threaded hole, and/or a slot.

Machine tool 20 further includes a cutting tool drive assembly 35, which is configured to rotate cutting tool 30, and a translation assembly 40, which is configured to operatively translate workpiece holder 25 and cutting tool 30 relative to one another during formation of the one or more features 52. Machine tool 20 also includes a machine controller 60. Machine controller 60 is adapted, configured, designed, constructed, and/or programmed to control the operation of at least a portion of a remainder of machine tool 20. As an example, machine controller 60 may control a rotational frequency of cutting tool 30 via control of cutting tool drive assembly 35, as illustrated in dotted lines and indicated at 61. As another example, machine controller 60 may control a relative orientation between cutting tool 30 and workpiece 50 via control of translation assembly 40, as illustrated in dotted lines and indicated at 62.

Cutting tool drive assembly 35 may include and/or be any suitable structure that may be configured to rotate cutting tool 30. Examples of cutting tool drive assembly 35 include any suitable spindle assembly, motorized spindle assembly, drive motor, and/or electric motor.

Translation assembly 40 may include any suitable structure that may, or that may be utilized to, operatively translate workpiece holder 25 and cutting tool 30 relative to one another. This may include operative translation of workpiece holder 25, operative translation of cutting tool 30, and/or operative translation of both workpiece holder 25 and cutting tool 30. With this in mind, translation assembly 40 is illustrated in dash-dot lines in FIG. 1 to illustrate that translation assembly 40 may be associated with, operatively attached to, and/or configured to operatively translate workpiece holder 25 and/or cutting tool 30 (such as via translation of at least a portion of cutting tool drive assembly 35). Examples of translation assembly 40 include any suitable X-Y stage, X-Y-Z stage, rotary stage, and/or linear actuator.

Machine controller 60 may include and/or be any suitable structure that may, or that may be utilized to, control the operation of at least the portion of the remainder of machine tool 20. This may include performing at least a portion of methods 200 and/or 300, which are discussed in more detail herein, and/or executing a program code 80 that may be recorded as a result of performing methods 200. Examples of machine controller 60 include an electronic controller, a dedicated computer, a special-purpose computer, and/or a personal computer.

As a more specific example, machine controller 60 may include a communications framework 66. Communications framework 66 may provide communications between a processor unit 68, a memory 70, persistent storage 72, a communications unit 74, an input/output (I/O) unit 76, and/or a display 78. Memory 70, persistent storage 72, communications unit 74, input/output (I/O) unit 76, and display 78 are examples of resources accessible by processor unit 68 via communications framework 66.

Processor unit 68 serves to run instructions that may be loaded into memory 70. Processor unit 68 may include a number of processors, a multi-processor core, or some other type of processor, depending on the particular implementation. Further, processor unit 68 may be implemented using a number of heterogeneous processor systems in which a main processor is present with secondary processors on a single chip. As another illustrative example, processor unit 68 may be a symmetric multi-processor system containing multiple processors of the same type.

Memory 70 and persistent storage 72 are examples of data storage devices 64. A data storage device 64 is any piece of hardware that is capable of storing information, such as, for example, without limitation, data, program code in functional form, and other suitable information either on a temporary basis or a permanent basis.

Data storage devices 64 also may be referred to herein as computer readable storage devices and/or as computer readable storage media 84 in these examples. Memory 70, in these examples, may be, for example, a random access memory or any other suitable volatile or non-volatile storage device. Persistent storage 72 may take various forms, depending on the particular implementation.

For example, persistent storage 72 may contain one or more components or devices. For example, persistent storage 72 may be a hard drive, a flash memory, a rewritable optical disk, a rewritable magnetic tape, or some combination of the above. The one or more components or devices used by persistent storage 72 also may be removable. For example, a removable hard drive may be used for persistent storage 72.

Communications unit 74, in these examples, provides for communications with other data processing systems or devices. In these examples, communications unit 74 may be a network interface card. Communications unit 74 may provide communications through the use of either or both physical and wireless communications links.

Input/output (I/O) unit 76 allows for input and output of data with other devices that may be connected to machine controller 60. For example, input/output (I/O) unit 76 may provide a connection for user input through a keyboard, a mouse, and/or some other suitable input device. Further, input/output (I/O) unit 76 may send output to a printer and/or to display 78. Display 78 provides a mechanism to display information to a user.

Instructions for the operating system, applications, and/or programs may be located in data storage devices 64, which may be in communication with processor unit 68 through communications framework 66. The instructions may be in a functional form on persistent storage 72. These instructions may be loaded into memory 70 for execution by processor unit 68. Processes of the different embodiments may be performed by processor unit 68 using computer-implemented instructions, which may be located in a memory, such as memory 70.

These instructions are referred to as program instructions, program code 80, computer usable program code, or computer readable program code that may be read and executed by a processor in processor unit 68. The instructions in the different embodiments may be located, stored, and/or embodied on different physical or computer readable storage media, such as memory 70 or persistent storage 72.

Program code 80 may be located in a functional form on computer readable media 82 that may be selectively removable and may be loaded onto or transferred to machine controller 60 for execution by processor unit 68. Program code 80 and computer readable media 82 may form a computer program product in these examples. In one example, computer readable media 82 may be computer readable storage media 84 or computer readable signal media 86.

Computer readable storage media 84 may include, for example, an optical or magnetic disk that is inserted or placed into a drive or other device that is part of persistent storage 72 for transfer onto a storage device, such as a hard drive, that is part of persistent storage 72. Computer readable storage media 84 also may take the form of persistent storage, such as a hard drive, a thumb drive, or a flash memory, that is connected to machine controller 60. In some instances, computer readable storage media 84 may not be removable from machine controller 60.

Computer readable storage media 84 are physical or tangible storage devices used to store program code 80 rather than media that propagate or transmit program code 80. Computer readable storage media 84 also are referred to as computer readable tangible storage devices or computer readable physical storage devices. In other words, computer readable storage media 84 are media that can be touched by a person.

Alternatively, program code 80 may be transferred to machine controller 60 using computer readable signal media 86. Computer readable signal media 86 may be, for example, propagated data signals containing program code 80. For example, computer readable signal media 86 may be electromagnetic signals, optical signals, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 80 may be downloaded over a network to persistent storage 72 from another device or data processing system through computer readable signal media 86 for use within machine controller 60. For instance, program code 80 stored in a computer readable storage medium in a server data processing system may be downloaded over a network from the server to machine controller 60. The data processing system providing program code 80 may be a server computer, a client computer, or some other device capable of storing and transmitting program code 80.

The different components illustrated for machine controller 60 are not meant to provide architectural limitations to the manner in which different embodiments may be implemented. The different illustrative embodiments may be implemented in a machine controller including components in addition to and/or in place of those illustrated for machine controller 60. Other components shown in FIG. 1 can be varied from the illustrative examples shown. The different embodiments may be implemented using any hardware device or system adapted, configured, designed, constructed, and or programmed to run program code 80. As one example, machine controller 60 may include organic components integrated with inorganic components and/or may be comprised entirely of organic components excluding a human being. For example, a storage device may be comprised of an organic semiconductor.

In another example, processor unit 68 may take the form of a hardware unit that has circuits that are manufactured or configured for a particular use. This type of hardware may perform operations without needing program code to be loaded into a memory from a storage device to be configured to perform the operations.

For example, when processor unit 68 takes the form of a hardware unit, processor unit 68 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 80 may be omitted, because the processes for the different embodiments are implemented and/or embedded in a hardware unit.

In still another illustrative example, processor unit 68 may be implemented using a combination of processors found in computers and hardware units. Processor unit 68 may have a number of hardware units and a number of processors that are configured to run program code 80. With this example, some of the processes may be implemented and/or embedded in the number of hardware units, while other processes may be implemented in the number of processors.

In another example, a bus system may be used to implement communications framework 66 and may be comprised of one or more buses, such as a system bus or an input/output bus. The bus system may be implemented using any suitable type of architecture that provides for a transfer of data between different components or devices attached to the bus system.

Additionally, communications unit 74 may include a number of devices that transmit data, receive data, or both transmit and receive data. Communications unit 74 may be, for example, a modem or a network adapter, two network adapters, or some combination thereof. Further, communications unit 74 may include a memory that may be, for example, memory 70, or a cache, such as that found in an interface and memory controller hub that may be present in communications framework 66.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Figure 2:
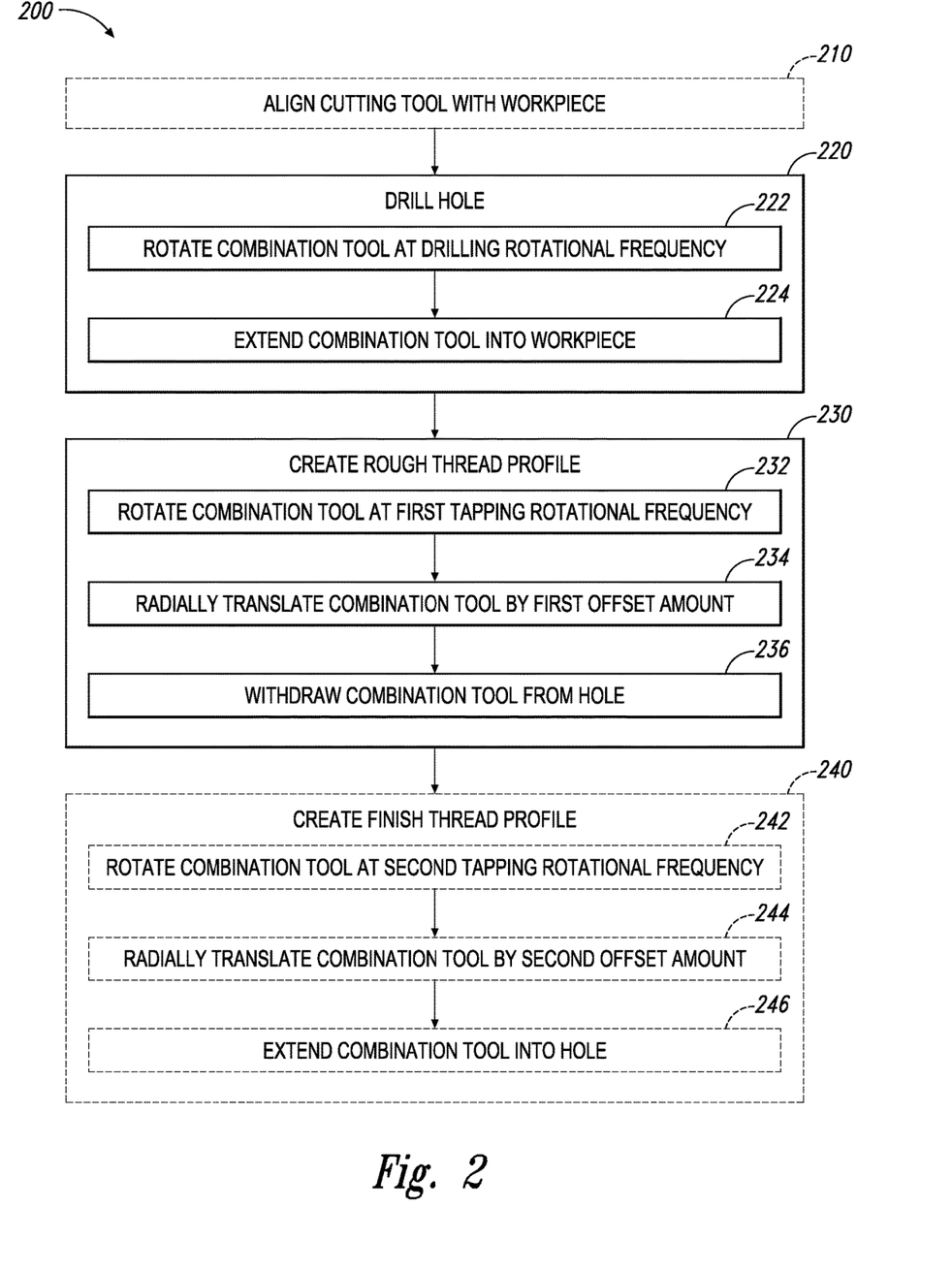
FIG. 2 is flowchart depicting methods, according to the present disclosure, of forming a threaded hole within a workpiece.
Figure 3:
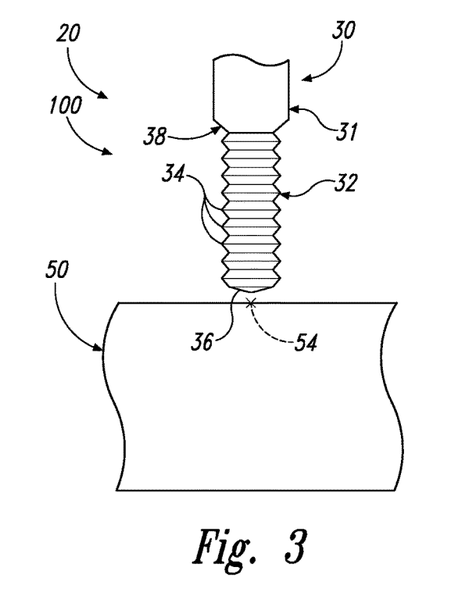
FIG. 3 is a schematic side view of a step of a machining operation, according to the present disclosure, for forming a threaded hole in a workpiece.

FIG. 2 is flowchart depicting methods 200, according to the present disclosure, of forming a threaded hole within a workpiece. Methods 200 may include aligning a cutting tool with a workpiece at 210 and include drilling a hole at 220 and creating a rough thread profile at 230. Methods 200 further may include creating a finish thread profile at 240. FIGS. 3-6 are schematic side views of steps of a machining operation 100, according to the present disclosure, for forming a threaded hole in a workpiece. The machining operation that is illustrated in FIGS. 3-6 may be performed utilizing machine tool 20 of FIG. 1, and any of the structures, components, and/or features of machine tool 20 of FIG. 1 may be included in and/or utilized with machining operation 100 of FIGS. 3-6 without departing from the scope of the present disclosure. In addition, machining operation 100 of FIGS. 3-6 may illustrate methods 200 of FIG. 2.

Figure 5:
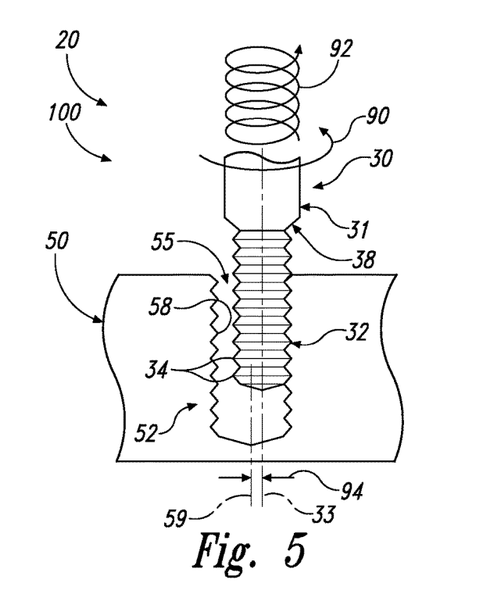
FIG. 5 is a schematic side view of another step in the machining operation of FIGS. 3-4.
Figure 6:
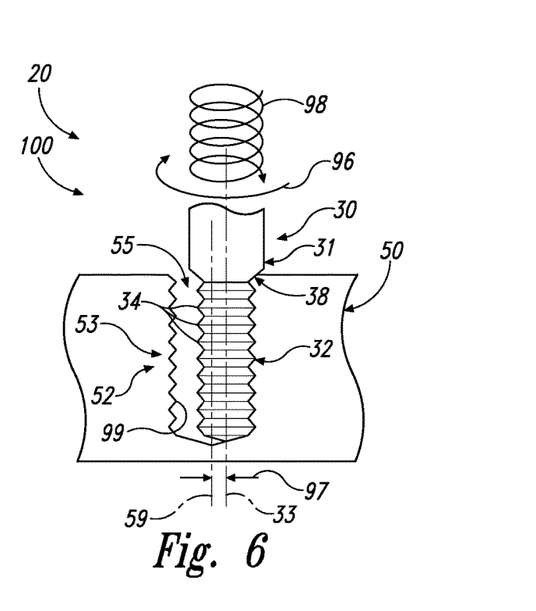
FIG. 6 is a schematic side view of another step in the machining operation of FIGS. 3-5.

Aligning the cutting tool with the workpiece at 210 may include aligning the cutting tool with any suitable reference location on the workpiece and may be accomplished in any suitable manner. As an example, and as illustrated schematically in FIG. 3, the aligning at 210 may include locating and/or aligning cutting tool 30, such as a combination tool 31, relative to workpiece 50. This may include aligning cutting tool 30 with a reference location 54 on workpiece 50 where a feature 52 (as illustrated in FIGS. 4-6) will be formed.

Drilling the hole at 220 may include forming and/or defining the hole in any suitable manner. As examples, and as illustrated in FIG. 2, the drilling at 220 may include rotating the combination tool at a drilling rotational frequency, as indicated at 222, and extending the combination tool into the workpiece at a drilling feed rate, as indicated at 224.

Figure 4:
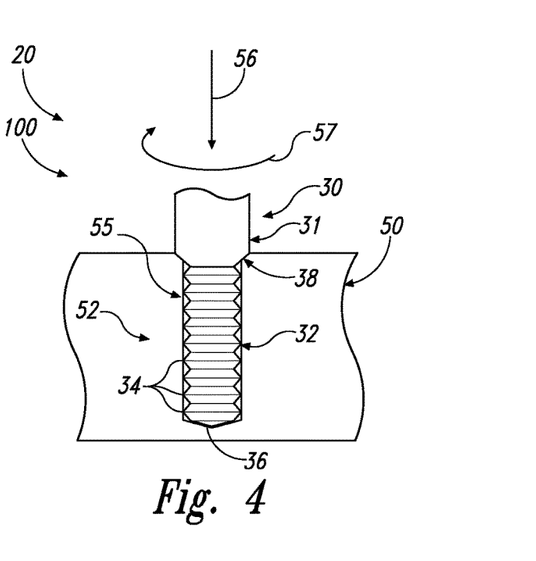
FIG. 4 is a schematic side view of another step in the machining operation of FIG. 3.

This is illustrated schematically in FIG. 4. Therein, machining operation 100 includes drilling hole 55 within workpiece 50. The rotating at 222 may include rotating combination tool 31, such as by utilizing cutting tool drive assembly 35 of FIG. 1, at any suitable drilling rotational frequency 57. Drilling rotational frequency 57 may be selected and/or based upon a diameter of hole 55, a length of hole 55, a material of construction of workpiece 50, a diameter of combination tool 31, and/or a material of construction of combination tool 31. The extending at 224 may include extending combination tool 31 into workpiece 50 in a drilling direction 56 at the drilling feed rate while performing the rotating at 222. This may operatively engage a drill 36 of combination tool 31 with workpiece 50, thereby forming hole 55. In addition, this also may operatively engage a chamfering portion 38 of combination tool 31 with workpiece 50, thereby chamfering hole 55.

Creating the rough thread profile at 230 may include forming and/or defining the rough thread profile in any suitable manner. As examples, and as illustrated in FIG. 2, the creating at 230 may include rotating the combination tool at a first tapping rotational frequency at 232, radially translating the combination tool by a first offset amount at 234, and withdrawing the combination tool from the hole at a first tapping feed rate at 236.

This is illustrated schematically in FIG. 5. Therein, machining operation 100 includes rotating combination tool 31 at first tapping rotational frequency 90 and radially translating combination tool 31 such that a centerline 33 of a thread mill 32 of combination tool 31 is spaced apart from a centerline 59 of hole 55 by a first offset amount 94. As further illustrated in FIG. 5, machining operation 100 also includes withdrawing combination tool 31 from hole 55 while translating combination tool 31 along a first helical tool path 92 at the first tapping feed rate to form a rough thread profile 58 within hole 55. First helical tool path 92 may be centered along centerline 59 of hole 55.

Creating the finish thread profile at 240 may include forming and/or defining the finish thread profile in any suitable manner. As examples, and as illustrated in FIG. 2, the creating at 240 may include rotating the combination tool at a second tapping rotational frequency at 242, radially translating the combination tool by a second offset amount at 244, and extending the combination tool into the hole at a second tapping feed rate at 246.

This is illustrated schematically in FIG. 6. Therein, machining operation 100 includes rotating combination tool 31 at a second tapping rotational frequency 96 and radially translating combination tool 31 such that centerline 33 of thread mill 32 is spaced apart from centerline 59 of hole 55 by a second offset amount 97 that is greater than first offset amount 94 of FIG. 5. As further illustrated in FIG. 6, machining operation 100 includes extending combination tool 31 into hole 55 while translating combination tool 31 along a second helical tool path 98 at the second tapping feed rate to form a finish thread profile 99 within hole 55 and define a threaded hole 53. Second helical tool path 98 may be centered along centerline 59 of hole 55 and may have a greater radius than first helical tool path 92 of FIG. 5.

As illustrated in FIGS. 3-6, methods 200 and/or machining operation 100 may be performed such that a plurality of, or even all, thread cutters 34 of thread mill 32 are simultaneously engaged in cutting new threads of threaded hole 53. This is in contrast to more traditional threading operations, which only may engage the endmost thread cutters of a thread mill. Such a configuration may decrease a time required to perform methods 200 and/or machining operation 100, may increase an efficiency of methods 200 and/or of machining operation 100, and/or may decrease wear on thread cutters 34 when forming threaded hole 53.

As discussed, the various steps of methods 200 and/or of machining operation 100 may include and/or utilize specific, dedicated, and/or selected machining parameters, such as drilling rotational frequency 57, first tapping rotational frequency 90, first helical tool path 92, first offset amount 94, second tapping rotational frequency 96, second offset amount 97, second helical tool path 98, a rate at which combination tool 31 is extended during the extending at 224, a rate at which combination tool 31 is withdrawn during the withdrawing at 236, and/or a rate at which combination tool 31 is extended during the extending at 246. These various parameters may be independently selected to improve a quality of threaded hole 53 that may be produced utilizing methods 200 and/or machining operation 100.

As an example, at least one of drilling rotational frequency 57, first tapping rotational frequency 90, and/or second tapping rotational frequency 96 may vary and/or be different from at least one other of drilling rotational frequency 57, first tapping rotational frequency 90, and/or second tapping rotational frequency 96. As another example, at least one of the rate at which combination tool 31 is extended during the extending at 224, the rate at which combination tool 31 is withdrawn during the withdrawing at 236, and/or the rate at which combination tool 31 is extended during the extending at 246 may vary from at least one other of the rate at which combination tool 31 is extended during the extending at 224, the rate at which combination tool 31 is withdrawn during the withdrawing at 236, and/or the rate at which combination tool 31 is extended during the extending at 246.

The systems and methods disclosed herein have, thus far, been discussed largely in the context of a machining operation 100 for creating a threaded hole 53. However, it is within the scope of the present disclosure that the systems and methods may be utilized to create and/or define any suitable feature 52 within workpiece 50. In addition, the disclosed systems and methods also may be performed automatically as a result of machine tool 20 and/or machine controller 60 thereof (as illustrated in FIG. 1) executing program code 80 that defines and/or causes machine tool 20 to execute an associative template. Such methods are discussed in more detail herein with reference to methods 300 of FIG. 7.

Figure 7:
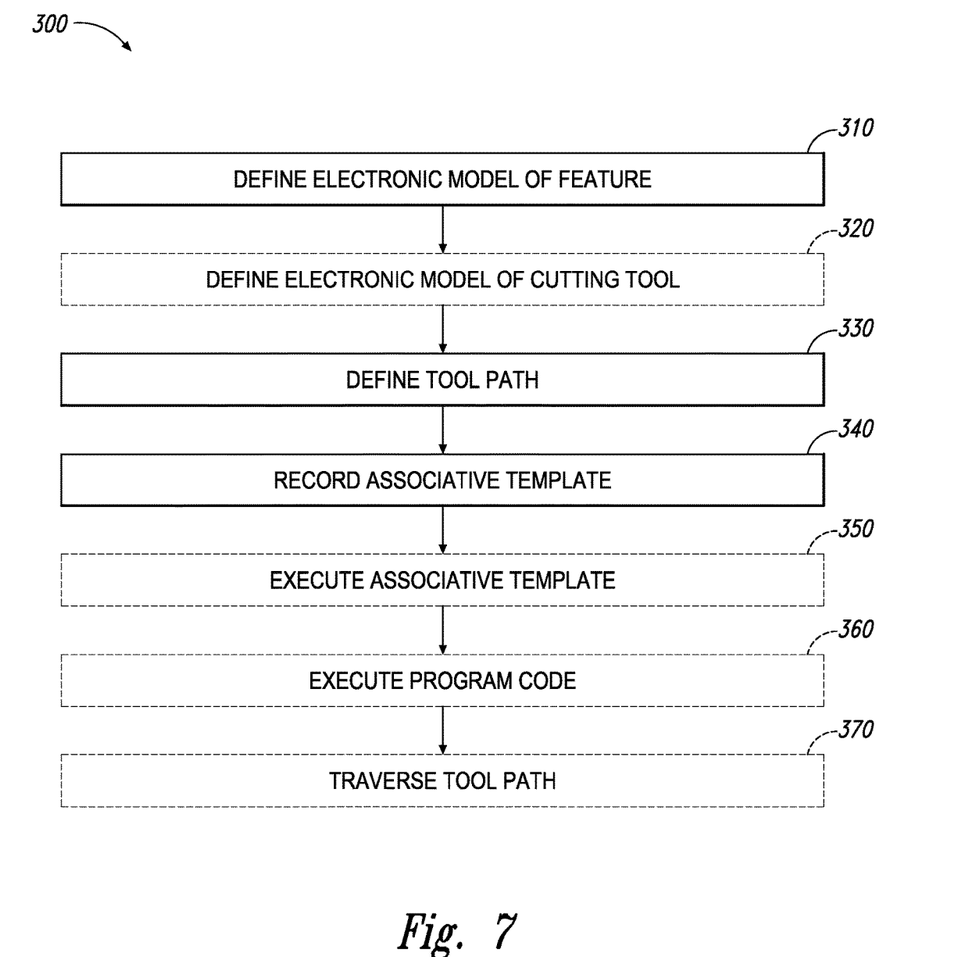
FIG. 7 is a flowchart depicting methods, according to the present disclosure, of utilizing an associative template for forming a feature within a workpiece with a machining operation.

FIG. 7 is a flowchart depicting methods 300, according to the present disclosure, of utilizing an associative template for forming a feature within a workpiece with a machining operation. Methods 300 include defining an electronic model of a feature at 310 and may include defining an electronic model of a cutting tool at 320. Methods 300 further include defining a tool path at 330 and recording an associative template at 340. Methods 300 also may include executing the associative template at 350, executing a program code at 360, and/or traversing the tool path at 370.

The defining at 310, the defining at 320, and/or the defining at 330 may define parameters that may be utilized by the associative template to define the feature. As such, the defining at 310, the defining at 320, and/or the defining at 330 may be referred to herein as defining reference parameters that may be utilized to define a reference feature in a reference workspace. The reference workspace may be a reference workspace of a computer aided machining software package and/or may describe the feature in the context of a reference workpiece. As discussed in more detail herein, these reference parameters may be changed, modified, and/or scaled within the associative template by a user to define actual parameters that may be utilized to form an actual feature in an actual workspace. The actual workspace may be an actual workspace of the computer aided machining software package and/or may describe the actual feature in the context of an actual workpiece.

Defining the electronic model of the feature at 310 may include defining any suitable electronic model that may specify and/or define any suitable portion of the feature. As an example, the defining at 310 may include defining a reference location for the feature within the reference workspace. As a more specific example, the reference location may include and/or be a center point, or a reference center point, of, or for, the feature. The reference location may be defined relative to the reference workspace, and the associative template may be configured to facilitate the user specifying an actual location of the feature within the actual workspace and/or on the actual workpiece. Additionally or alternatively, the reference location may include and/or be a generic location that may not be associated with a specific feature. The actual location may be different from the reference location, the actual workspace may be different from the reference workspace, and/or the actual workpiece may be different from the reference workpiece. As a more specific example, the associative template may be configured to facilitate the user entering a relative and/or absolute location offset to define the actual location relative to the reference location.

As another example, the defining at 310 additionally or alternatively may include defining one or more reference dimensions of the feature within the reference workspace. Examples of the reference dimensions include a reference depth of the feature and/or a reference diameter of the feature. Under these conditions, the associative template may be configured to facilitate a user specifying one or more actual dimensions of the feature within the actual workspace. The actual dimensions may be different from the reference dimensions. As a more specific example, the associative template may be configured to facilitate the user entering a relative and/or absolute dimension scaling factor to define the one or more actual dimensions relative to the one or more reference dimensions.

Defining the electronic model of the cutting tool at 320 may include defining any suitable electronic model that may specify and/or define any suitable property, shape, and/or contour of the cutting tool. As an example, the defining at 320 may include defining a reference shape of the cutting tool. The reference shape of the cutting tool may be defined relative to and/or based upon the reference feature, and the associative template may be configured to facilitate the user specifying an actual shape of the cutting tool that is based upon the actual feature and/or that is different from the reference shape of the cutting tool. As an example, the associative template may be configured to facilitate the user entering a relative and/or absolute shape scaling factor to define the actual shape of the cutting tool relative to the reference shape of the cutting tool.

As more specific examples, the defining the electronic model of the cutting tool may include defining a reference length of the cutting tool and/or a reference diameter of the cutting tool. Under these conditions, the associative template may be configured to facilitate the user specifying an actual length of the cutting tool, which may be different from the reference length of the cutting tool, and/or specifying an actual diameter of the cutting tool, which may be different from the reference diameter of the cutting tool. For example, the associative template may be configured to facilitate the user entering a relative and/or absolute length scaling factor to define the actual length of the cutting tool relative to the reference length of the cutting tool. As another example, the associative template may be configured to facilitate the user entering a relative and/or absolute diameter scaling factor to define the actual diameter of the cutting tool relative to the reference diameter of the cutting tool.

The defining at 320 is illustrated in dashed lines in FIG. 7 to indicate that the defining at 320 is an optional step of methods 300. As such, it is within the scope of the present disclosure that methods 300 may include performing the defining at 310, performing the defining at 330, performing the recording at 340, performing the executing at 350, performing the executing at 360, and/or performing the traversing at 370 without, or without first, performing the defining at 320.

Defining the tool path at 330 may include defining any suitable tool path that is to be traversed by the cutting tool to form the feature. Generally, the tool path is selected, defined, and/or specified such that, upon traversing the tool path within the workpiece, the cutting tool machines the workpiece to form and/or define the feature within the workpiece. The defining at 330 may include defining a rotational frequency for the cutting tool when the cutting tool traverses the tool path. The defining at 330 also may include defining a feed rate at which the cutting tool travels and/or translates relative to the workpiece when the cutting tool traverses the tool path (i.e., a rate at which the cutting tool traverses the tool path).

It is within the scope of the present disclosure that the tool path may include a plurality of sequential tool paths that define discrete and/or independent portions and/or segments of an overall tool path. As such, the defining at 330 may include defining a first tool path and also defining a second tool path that is different from, or configured to be traversed after, the first tool path. Under these conditions, the defining at 330 may include defining a first rotational frequency and/or a first feed rate for the cutting tool when the cutting tool traverses the first tool path and also defining a second rotational frequency and/or a second feed rate for the cutting tool when the cutting tool traverses the second tool path. The first rotational frequency may be different from the second rotational frequency and/or the first feed rate may be different from the second feed rate.

The defining at 330 may include defining a reference tool path for the reference cutting tool. Under these conditions, the associative template may be configured to facilitate the user specifying an actual tool path that may be different from the reference tool path. As an example, the associative template may be configured to facilitate the user entering a relative and/or absolute tool path scaling factor, which may define the actual tool path relative to the reference tool path.

As a more specific example, the feature may include and/or be a threaded hole. Under these conditions, the cutting tool may include and/or be a combination tool, such as combination tool 31 of FIGS. 3-6, and the defining at 330 may include defining a tool path that causes the combination tool to form and/or define the threaded hole within the workpiece. More specifically, the defining at 330 may include defining a first tool path that extends the combination tool into the workpiece in a drilling direction and defining a second tool path that translates the combination tool radially such that a centerline of a thread mill of the combination tool is spaced apart from a centerline of the hole by a first offset amount. The defining at 330 further may include defining a third tool path that withdraws the combination tool from the hole while translating the combination tool along a first helical tool path that is centered along the centerline of the hole. Thus, methods 300 initially form the threads of the threaded hole while the combination tool traverses the third tool path and a plurality of, or even all, thread cutters of the thread mill is simultaneously engaged in cutting new threads of the threaded hole. This may improve a quality of the produced threads and/or decrease wear of the thread mill, as discussed herein.

Under certain circumstances, it may be desirable to form the threads of the threaded hole in two passes. Such a method may improve a quality of the produced threads and/or may decrease a need to subsequently chase the threads with a tap. Under these conditions, the defining at 330 also may include defining a fourth tool path that translates the combination tool radially such that the centerline of the thread mill is spaced apart from the centerline of the hole by a second offset amount that is greater than the first offset amount. The defining at 330 then may include defining a fifth tool path that extends the combination tool into the hole while translating the combination tool along a second helical tool path that is centered on the centerline of the hole and that has a second radius that is greater than a first radius of the first helical tool path.

Recording the associative template at 340 may include recording the associative template as program code. The program code may be configured to program an electronically controlled machine tool to automatically define the electronic model of the feature and/or to automatically define the tool path responsive to user selection of the program code at, or on, the electronically controlled machine tool. The electronically controlled machine tool may be configured to perform the machining operation, and to automatically form the feature within the workpiece responsive to execution of the program code. As an example, the program code and/or the associative template may be configured to be imported as a computer aided machining object for the electronically controlled machine tool.

The recording at 340 may include electronically recording, storing, and/or archiving the associative template in any suitable manner. As an example, the recording at 340 may include recording the associative template on computer readable storage media. As another example, the recording at 340 may include recording computer-executable instructions that, when executed, direct the electronically controlled machine tool to form the feature within the workpiece. As yet another example, the recording at 340 may include recording a visual basic script.

It is within the scope of the present disclosure that the defining at 310, the defining at 330, and/or the recording at 340 may be accomplished in any suitable manner. As examples, the defining at 310, the defining at 330, and the recording at 340 may be performed on, or utilizing, a computer aided machining software package and/or a computer aided design software package.

Executing the associative template at 350 may include executing the associative template with, or on, the computer aided machine tool. This may include causing the computer aided machine tool to form the feature within the workpiece and/or traversing the cutting tool, with and/or via the computer aided machine tool, along the tool path that was defined during the defining at 330. The associative template may permit and/or facilitate repeated formation of the feature within the workpiece without a need to separately perform the defining at 310 and the defining at 330 for each feature that is formed within the workpiece. As such, the executing at 350 may include executing the associative template a plurality of times with the electronically controlled machine tool to form a respective plurality of spaced-apart features within the workpiece.

Executing the program code at 360 may include executing the program code with, or on, the computer aided machine tool. This may include causing the computer aided machine tool to form the feature within the workpiece and/or traversing the cutting tool, with and/or via the computer aided machine tool, along the tool path that was defined during the defining at 330. The executing at 360 may be, or may be performed, responsive to user selection of the associative template from within a control software of the electronically controlled machine tool. Additionally or alternatively, the executing at 360 also may be, or may be performed, responsive to user selection of the associative template from within a template software package that is separate, or different, from the control software for the electronically controlled machine tool. Under these conditions, the template software package may communicate with the control software for the electronically controlled machine tool to direct the computer aided machine tool to execute the program code.

Traversing the tool path at 370 may include traversing the tool path within the workpiece with the cutting tool to form and/or define the feature within the workpiece. The traversing at 370 may be performed responsive to the electronically controlled machine tool executing the program code, such as via the executing at 350 and/or the executing at 360, which are discussed herein.

Examples of inventive subject matter according to the present disclosure are described in the following enumerated paragraphs:

A1. A method of utilizing an associative template for forming a feature within a workpiece with a machining operation, the method comprising:

defining an electronic model of the feature;

defining a tool path to be traversed by a cutting tool configured to form the feature, wherein the tool path is defined such that, upon traversing the tool path within the workpiece, the cutting tool machines the workpiece to form the feature within the workpiece; and recording the associative template as a program code, wherein the program code is configured to program an electronically controlled machine tool, which is configured to perform the machining operation, to automatically define the electronic model of the feature and automatically define the tool path responsive to user selection of the program code on the electronically controlled machine tool, and further wherein the electronically controlled machine tool is configured to automatically form the feature within the workpiece responsive to the program code being executed by the electronically controlled machine tool.

A2. The method of paragraph A1, wherein the method further includes traversing the tool path within the workpiece with the cutting tool to form the feature within the workpiece.

A3. The method of paragraph A2, wherein the traversing is responsive to the program code being executed by the electronically controlled machine tool.

A4. The method of any of paragraphs A1-A3, wherein the method further includes executing the program code with the electronically controlled machine tool to form the feature within the workpiece.

A5. The method of any of paragraphs A1-A4, wherein the method further includes executing the program code a plurality of times with the electronically controlled machine tool to form a respective plurality of spaced-apart features within the workpiece.

A6. The method of any of paragraphs A1-A5, wherein the method further includes executing the program code with the electronically controlled machine tool.

A7. The method of paragraph A6, wherein the executing is responsive to a user selection of the associative template from within a control software of the electronically controlled machine tool.

A8. The method of any of paragraphs A6-A7, wherein the executing is responsive to a user selection of the associative template from within a template software package that is separate from a/the control software of the electronically controlled machine tool.

A9. The method of any of paragraphs A1-A8, wherein the defining the electronic model of the feature includes defining a reference location for the feature within a reference workspace.

A10. The method of paragraph A9, wherein the reference location includes a center point of the feature.

A11. The method of any of paragraphs A9-A10, wherein the associative template is configured to facilitate a/the user specifying at least one of:

(i) an actual location of the feature within an actual workspace, wherein the actual location is different from the reference location; and (ii) a generic location that is defined without reference to the feature.

A12. The method of paragraph A11, wherein the associative template is configured to facilitate the user entering a location offset to define the actual location relative to the reference location.

A13. The method of any of paragraphs A1-A12, wherein the defining the electronic model of the feature includes defining at least one reference dimension of the feature within a/the reference workspace.

A14. The method of paragraph A13, wherein the at least one reference dimension includes a depth of the feature.

A15. The method of any of paragraphs A13-A14, wherein the at least one reference dimension includes a diameter of the feature.

A16. The method of any of paragraphs A13-A15, wherein the associative template is configured to facilitate a/the user specifying at least one actual dimension of the feature within an/the actual workspace, wherein the at least one actual dimension is different from the at least one reference dimension.

A17. The method of paragraph A16, wherein the associative template is configured to facilitate the user entering a dimension scaling factor to define the at least one actual dimension of the feature relative to the at least one reference dimension.

A18. The method of any of paragraphs A1-A17, wherein the method further includes defining an electronic model of the cutting tool.

A19. The method of paragraph A18, wherein the defining the electronic model of the cutting tool includes defining a reference shape of the cutting tool.

A20. The method of paragraph A19, wherein the associative template is configured to facilitate a/the user specifying an actual shape of the cutting tool, wherein the actual shape of the cutting tool is different from the reference shape of the cutting tool.

A21. The method of paragraph A20, wherein the associative template is configured to facilitate the user entering a shape scaling factor to define the actual shape of the cutting tool relative to the reference shape of the cutting tool.

A22. The method of any of paragraphs A18-A21, wherein the defining the electronic model of the cutting tool includes defining a reference length of the cutting tool.

A23. The method of paragraph A22, wherein the associative template is configured to facilitate a/the user specifying an actual length of the cutting tool, wherein the actual length of the cutting tool is different from the reference length of the cutting tool.

A24. The method of paragraph A23, wherein the associative template is configured to facilitate the user entering a length scaling factor to define the actual length of the cutting tool relative to the reference length of the cutting tool.

A25. The method of any of paragraphs A18-A24, wherein the defining the electronic model of the cutting tool includes defining a reference diameter of the cutting tool.

A26. The method of paragraph A25, wherein the associative template is configured to facilitate a/the user specifying an actual diameter of the cutting tool, wherein the actual diameter of the cutting tool is different from the reference diameter of the cutting tool.

A27. The method of paragraph A26, wherein the associative template is configured to facilitate the user entering a diameter scaling factor to define the actual diameter of the cutting tool relative to the reference diameter of the cutting tool.

A28. The method of any of paragraphs A1-A27, wherein the defining the tool path includes defining a rotational frequency for the cutting tool when the cutting tool traverses the tool path.

A29. The method of any of paragraphs A1-A28, wherein the defining the tool path includes defining a plurality of sequential tool paths that includes at least a first tool path and a second tool path.

A30. The method of paragraph A29, wherein the first tool path is different from the second tool path.

A31. The method of any of paragraphs A29-A30, wherein the defining the tool path further includes defining a first rotational frequency for the cutting tool when the cutting tool traverses the first tool path and defining a second rotational frequency for the cutting tool when the cutting tool traverses the second tool path, wherein the first rotational frequency is different from the second rotational frequency.

A32. The method of any of paragraphs A29-A31, wherein the defining the tool path further includes defining a first feed rate for the cutting tool when the cutting tool traverses the first tool path and defining a second feed rate for the cutting tool when the cutting tool traverses the second tool path, wherein the first feed rate is different from the second feed rate.

A33. The method of any of paragraphs A1-A32, wherein the defining the tool path includes defining a reference tool path.

A34. The method of paragraph A33, wherein the associative template is configured to facilitate a/the user specifying an actual tool path, wherein the actual tool path is different from the reference tool path.

A35. The method of paragraph A34, wherein the associative template is configured to facilitate the user entering a tool path scaling factor to define the actual tool path relative to the reference tool path.

A36. The method of any of paragraphs A1-A35, wherein the feature includes a threaded hole, wherein the cutting tool includes a combination tool that includes a drill, a thread mill, and a chamfering portion, and further wherein the defining the tool path includes:
  (i) defining a/the first tool path that extends the cutting tool into the workpiece in a drilling direction, optionally at a drilling rotational frequency and at a drilling feed rate, to form a hole in the workpiece and chamfer the hole;
  (ii) defining a/the second tool path that translates the cutting tool radially such that a centerline of the cutting tool is spaced apart from a centerline of the hole by a first offset amount; and
  (iii) defining a third tool path that withdraws the cutting tool from the hole while translating the cutting tool along a first helical tool path that is centered along the centerline of the hole, optionally at a first tapping rotational frequency and at a first tapping feed rate, to form the threaded hole.

A37. The method of paragraph A36, wherein the method further includes:
  (i) defining a fourth tool path that translates the cutting tool radially such that the centerline of the cutting tool is spaced apart from the centerline of the threaded hole by a second offset amount, wherein the second offset amount is greater than the first offset amount; and
  (ii) defining a fifth tool path that extends the cutting tool into the threaded hole while translating the cutting tool along a second helical tool path that is centered along the centerline of the threaded hole, optionally at a second tapping rotational frequency and at a second tapping feed rate, wherein a second radius of the second helical tool path is greater than a first radius of the first helical tool path.

A38. The method of any of paragraphs A36-A37, wherein the associative template is configured to be imported as a computer aided machining object for the electronically controlled machine tool and initially forms threads for the threaded hole while the cutting tool traverses the third tool path such that a plurality of thread cutters, and optionally each thread cutter, of the cutting tool is simultaneously engaged in cutting new threads of the threaded hole.

A39. The method of any of paragraphs A1-A38, wherein the recording the associative template includes recording the associative template on computer readable storage media.

A40. The method of any of paragraphs A1-A39, wherein the recording the associative template includes recording computer-executable instructions that, when executed, direct the electronically controlled machine tool to form the feature within the workpiece.

A41. The method of any of paragraphs A1-A40, wherein the defining the electronic model of the feature, defining the tool path, and recording the associative template are performed utilizing at least one of:
  (i) a computer aided machining software package; and
  (ii) a computer aided design software package.

A42. The method of any of paragraphs A1-A41, wherein the program code includes a Visual Basic script.

B1. An electronically controlled machine tool, comprising:
  a workpiece holder configured to support a workpiece;
  a cutting tool;
  a cutting tool drive assembly configured to rotate the cutting tool;
  a translation assembly configured to operatively translate the workpiece holder and the cutting tool relative to one another; and
  a machine controller programmed to control operation of the cutting tool drive assembly and the translation assembly utilizing the program code of any of paragraphs A1-A42.

B2. The tool of paragraph B1, wherein the workpiece holder includes a vise.

B3. The tool of any of paragraphs B1-B2, wherein the cutting tool drive assembly includes a motorized spindle assembly that includes a drive motor, and further wherein the machine controller is configured to control a rotational frequency of the cutting tool.

B4. The tool of any of paragraphs B1-B3, wherein the translation assembly includes at least one of an X-Y stage, an X-Y-Z stage, a rotary stage, and a linear actuator.

B5. The tool of any of paragraphs B1-B4, wherein the machine controller includes at least one of:
  (i) a communications framework;
  (ii) a processor unit;
  (iii) a data storage device;
  (iv) memory;
  (v) persistent storage;
  (vi) a communications unit;
  (vii) an input/output unit;
  (viii) a display;
  (ix) a storage device;
  (x) computer readable media;
  (xi) computer readable storage media; and
  (xii) computer readable signal media.

B6. The tool of any of paragraphs B1-B5, wherein the machine controller is programmed to execute the program code.

B7. The tool of any of paragraphs B1-B6, wherein the machine controller includes at least one of an electronic controller, a dedicated computer, a special-purpose computer, and a personal computer.

B8. Computer readable storage media including computer-executable instructions that, when executed, direct an electronically controlled machine tool to execute the program code of any of paragraphs A1-A42.

C1. The method of any of paragraphs A1-A42, the tool of any of paragraphs B1-B7, or the media of paragraph B8, wherein the feature includes, and optionally is, at least one of a/the hole, a/the threaded hole, and a slot.

C2. The method of any of paragraphs A1-A42 or C1, the tool of any of paragraphs B1-B7 or C1, or the media of paragraph B8 or C1, wherein the cutting tool includes, and optionally is, at least one of an end mill, a/the thread mill, a/the combination tool, and a drill bit.

D1. A method of forming a threaded hole within a workpiece with a combination tool, the method comprising:
  drilling a hole by:
    (i) rotating the combination tool at a drilling rotational frequency; and
    (ii) extending the combination tool into the workpiece in a drilling direction to form the hole with a drill bit of the combination tool; and
  creating a rough thread profile within the hole by:
    (i) rotating the combination tool at a first tapping rotational frequency;
    (ii) radially translating the combination tool such that a centerline of a thread mill of the combination tool is spaced apart from a centerline of the hole by a first offset amount; and
    (iii) withdrawing the combination tool from the hole while translating the combination tool along a first helical tool path that is centered along the centerline of the hole.

D2. The method of paragraph D1, wherein the method further includes creating a finish thread profile within the hole by:
  (i) rotating the combination tool at a second tapping rotational frequency;
  (ii) radially translating the tread mill such that the centerline of the combination tool is spaced apart from the centerline of the hole by a second offset amount, wherein the second offset amount is greater than the first offset amount; and
  (iii) extending the combination tool into the hole while translating the combination tool along a second helical tool path that is centered along the centerline of the hole, wherein a second radius of the second helical tool path is greater than a first radius of the first helical tool path.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of utilizing an associative template for forming a feature within a workpiece with a machining operation, the method comprising:
  defining an electronic model of the feature;
  defining a tool path to be traversed by a cutting tool configured to form the feature, wherein the tool path is defined such that, upon traversing the tool path within the workpiece, the cutting tool machines the workpiece to form the feature within the workpiece; and
  recording the associative template as a program code, wherein the program code is configured to program an electronically controlled machine tool, which is configured to perform the machining operation, to automatically define the electronic model of the feature and automatically define the tool path responsive to user selection of the program code on the electronically controlled machine tool, and further wherein the electronically controlled machine tool is configured to automatically form the feature within the workpiece responsive to the program code being executed by the electronically controlled machine tool;
  wherein the feature includes a threaded hole, wherein the cutting tool includes a combination tool that includes a drill, a thread mill, comprising a plurality of thread cutters spaced apart along a centerline of the cutting tool, and a chamfering portion, and further wherein the defining the tool path includes:
    defining a first tool path that extends the cutting tool into the workpiece in a drilling direction at a drilling rotational frequency and at a drilling feed rate to form a hole in the workpiece and chamfer the hole;

defining a second tool path that, while the cutting tool is extended in to the workpiece according to the first tool path, translates the cutting tool radially such that the centerline of the cutting tool is spaced apart from a centerline of the hole by a first offset amount and the plurality of thread cutters simultaneously cut into the hole formed in the workpiece; and defining a third tool path that, while the centerline of the cutting tool is spaced apart from the centerline of the hole by the first offset amount, withdraws the cutting tool from the hole while translating the cutting tool along a first helical tool path that is centered along the centerline of the hole at a first tapping rotational frequency and at a first tapping feed rate to cut the threaded hole such that the plurality of thread cutters simultaneously cut threads, spaced apart along the centerline of the hole, into the hole formed in the workpiece.

2. The method of claim 1, wherein the method further includes traversing the tool path within the workpiece with the cutting tool to form the feature within the workpiece.

3. The method of claim 1, wherein the method further includes executing the program code a plurality of times with the electronically controlled machine tool to form a respective plurality of spaced-apart features within the workpiece.

4. The method of claim 1, wherein the method further includes executing the program code with the electronically controlled machine tool.

5. The method of claim 4, wherein the executing is responsive to a user selection of the associative template from within a control software of the electronically controlled machine tool.

6. The method of claim 4, wherein the executing is responsive to a user selection of the associative template from within a template software package that is separate from a control software of the electronically controlled machine tool.

7. The method of claim 1, wherein the defining the electronic model of the feature includes defining a reference location for the feature within a reference workspace.

8. The method of claim 7, wherein the associative template is configured to facilitate a user specifying an actual location of the feature within an actual workspace, wherein the actual location is different from the reference location.

9. The method of claim 1, wherein the defining the electronic model of the feature includes defining at least one reference dimension of the feature within a reference workspace.

10. The method of claim 9, wherein the associative template is configured to facilitate a user specifying at least one actual dimension of the feature within an actual workspace, wherein the at least one actual dimension is different from the at least one reference dimension.

11. The method of claim 1, wherein the defining the tool path includes defining a rotational frequency for the cutting tool when the cutting tool traverses the tool path.

12. The method of claim 1, wherein the defining the tool path includes defining a plurality of sequential tool paths that includes at least a first tool path and a second tool path, wherein the first tool path is different from the second tool path.

13. The method of claim 12, wherein the defining the tool path further includes defining a first rotational frequency for the cutting tool when the cutting tool traverses the first tool path and defining a second rotational frequency for the cutting tool when the cutting tool traverses the second tool path, wherein the first rotational frequency is different from the second rotational frequency.

14. The method of claim 12, wherein the defining the tool path further includes defining a first feed rate for the cutting tool when the cutting tool traverses the first tool path and defining a second feed rate for the cutting tool when the cutting tool traverses the second tool path, wherein the first feed rate is different from the second feed rate.

15. The method of claim 1, wherein the defining the tool path includes defining a reference tool path, and further wherein the associative template is configured to facilitate a user specifying an actual tool path, wherein the actual tool path is different from the reference tool path.

16. The method of claim 1, wherein the method further includes:
(i) defining a fourth tool path that translates the cutting tool radially such that the centerline of the cutting tool is spaced apart from the centerline of the threaded hole by a second offset amount, wherein the second offset amount is greater than the first offset amount; and
(ii) defining a fifth tool path that extends the cutting tool into the threaded hole while translating the cutting tool along a second helical tool path that is centered along the centerline of the threaded hole at a second tapping rotational frequency and at a second tapping feed rate, wherein a second radius of the second helical tool path is greater than a first radius of the first helical tool path such that the plurality of thread cutters further cut the workpiece along the threads to form a finish thread profile.

17. The method of claim 1, wherein the associative template is configured to be imported as a computer aided machining object for the electronically controlled machine tool.

18. Computer readable storage media including computer-executable instructions that, when executed, direct an electronically controlled machine tool to execute program code to perform a machining operation to automatically define an electronic model of a feature, automatically define a tool path responsive to user selection of the program code, and automatically form the feature within a workpiece;
wherein the tool path is to be traversed by a cutting tool configured to form the feature;
wherein the tool path is defined such that, upon traversing the tool path within the workpiece, the cutting tool machines the workpiece to form the feature within the workpiece;
wherein the feature includes a threaded hole, wherein the cutting tool includes a combination tool that includes a drill, a thread mill, comprising a plurality of thread cutters spaced apart along a centerline of the cutting tool, and a chamfering portion, and further wherein the defining the tool path includes:
defining a first tool path that extends the cutting tool into the workpiece in a drilling direction at a drilling rotational frequency and at a drilling feed rate to form a hole in the workpiece and chamfer the hole;
defining a second tool path that, while the cutting tool is extended in to the workpiece according to the first tool path, translates the cutting tool radially such that the centerline of the cutting tool is spaced apart from a centerline of the hole by a first offset amount and the plurality of thread cutters simultaneously cut into the hole formed in the workpiece; and defining a third tool path that, while the centerline of the cutting tool is spaced apart from the centerline of the hole by the first offset amount, withdraws the cutting tool from the hole while translating the cutting tool along a first helical tool path that is centered along the centerline of the hole at a first tapping rotational frequency and at a first tapping feed rate to cut the threaded hole such that the plurality of thread cutters simultaneously cut threads, spaced apart along the centerline of the hole, into the hole formed in the workpiece.

19. An electronically controlled machine tool, comprising:
    a workpiece holder configured to support a workpiece;
    a cutting tool comprising a combination tool that includes a drill, a thread mill, comprising a plurality of thread cutters spaced apart along a centerline of the cutting tool, and a chamfering portion;
    a cutting tool drive assembly configured to rotate the cutting tool;
    a translation assembly configured to operatively translate the workpiece holder and the cutting tool relative to one another; and
    a machine controller programmed to control operation of the cutting tool drive assembly and the translation assembly, wherein the machine controller is programmed to execute a program code of an associative template, wherein the program code is configured to program the electronically controlled machine tool to perform a machining operation and to automatically define an electronic model of a feature and a tool path for a cutting tool that is utilized to form the feature within the workpiece responsive to user selection of the program code, and further wherein the electronically controlled machine tool is configured to automatically form the feature within the workpiece responsive to executing the program code, wherein the tool path comprises:
    a first tool path that extends the cutting tool into the workpiece in a drilling direction at a drilling rotational frequency and at a drilling feed rate to form a hole in the workpiece and chamfer the hole;
    a second tool path that, while the cutting tool is extended in to the workpiece according to the first tool path, translates the cutting tool radially such that the centerline of the cutting tool is spaced apart from a centerline of the hole by a first offset amount and the plurality of thread cutters simultaneously cut into the hole formed in the workpiece; and
    a third tool path that, while the centerline of the cutting tool is spaced apart from the centerline of the hole by the first offset amount, withdraws the cutting tool from the hole while translating the cutting tool along a first helical tool path that is centered along the centerline of the hole at a first tapping rotational frequency and at a first tapping feed rate to cut the threaded hole such that the plurality of thread cutters simultaneously cut threads, spaced apart along the centerline of the hole, into the hole formed in the workpiece.

* * * * *